UNITED STATES PATENT OFFICE 2,386,798

RECOVERY OF CATALYSTS

Everett C. Hughes, Cleveland Heights, Ohio, assignor to The Standard Oil Company, Cleveland, Ohio, a corporation of Ohio No Drawing. Application October 31, 1942, Serial No. 464,111

15 Claims. (Cl. 23—153)

This invention relates to the recovery of catalysts. More particularly the invention relates to the recovery of catalysts comprising either hydrogen fluoride, boron trifluoride or a mixture comprising both in any proportion, by means of an absorbent comprising a di-aryl ketone.

Hydrogen fluoride, boron trifluoride or a mixture thereof, when used alone or with other compounds exerts certain catalytic effects in certain chemical reactions, particularly reactions involving hydrocarbons. These reactions are not a part of this invention, and therefore need not be referred to in any greater detail. Some of the products resulting from these reactions or some of the starting components may have the catalysts in admixture therewith in a physical or physiochemical admixture or loose chemical combination, and it may be desirable to separate the catalyst from these products. This desideratum is of significance not only when the product is to be freed from the catalyst, but also when it is desired to separate the catalyst to prevent the loss thereof and for reuse, particularly when the product with which the catalyst is admixed is one of the lesser valuable products or a by-product of the reaction, and when it contains a significant amount of the catalyst. The recovery of the catalyst is of particular significance if the product containing the same is not to be recycled or is a waste product, and its disposal would entail a substantial loss of the catalyst.

It has been discovered that hydrogen fluoride or boron trifluoride or both forms a complex with or is absorbed by certain di-aryl ketones under appropriate conditions, and that this complex absorption product can be disassociated to release the above named fluorides from the ketone under other appropriate conditions. This discovery is utilized in accordance with this invention to separate the fluorides by absorption from hydrocarbon or other chemical compounds with which the fluorides are admixed, for the purpose among others of recovering the fluorides for further use, if desired, as a catalyst or for other purposes.

Hydrogen fluoride boils at 67 deg. F., and therefore when utilized in reactions at temperatures above room temperature, it is gaseous unless maintained under suitable pressures. Boron trifluoride (b. p. —150 deg. F.) is a gas unless liquefied by appropriate temperatures and pressures. Hydrogen fluoride and boron trifluoride can be mixed in any proportions and the mixture can exist as a liquid or gas. Either of the fluorides or a mixture thereof, or any of the above with other chemical components may be used as a catalyst either in the liquid or gaseous phase depending on the reaction involved, and the conditions of temperature and pressure under which it is carried out. The products of the reaction, or the unreacted components, when released at any predetermined temperature and pressure may be liquid or gaseous or both, or the products or components in either form under such conditions may contain the fluoride catalysts in simple admixture or more complex forms of combination. The invention may be used for separating the fluoride catalyst in any of these forms. However, because of the relatively low boiling points of the fluorides, the invention assumes particular significance when one of the products of the reaction is gaseous and is mixed with a substantial amount of the catalyst in gaseous form. Because of this significance the invention will be described hereinafter in connection with illustrative examples in which the catalyst is in gaseous form.

The di-aryl ketone that may be used as the absorbent in accordance with the invention may be illustrated by the general formula:

where R and R₁ may be of any aryl group, such as phenyl, naphthyl, anthryl, diphenyl, for example. Either or both aryl groups may contain substituents such as halogen or lower alkyl radicals, i. e., methyl, ethyl, etc. Insofar as has been ascertained, it seems to be of importance only that the carbon atoms attached to the keto group not have hydrogen attached to them and this condition is fulfilled by any of the above defined compounds. The compound to be used should be selected with reference to its melting and boiling point and the conditions under which the absorbent and desorbent action is carried out. Benzophenone is a compound readily available for practicing the invention and its properties are suitable for a wide variety of treatments. Any of the allotropic forms or a mixture of any of them may be used. Accordingly, benzophenone will be referred to hereinafter in illustrating the invention but not as limitative thereof.

If it is desired, the di-aryl ketone may be mixed with any unreactive aromatic or other compound soluble with the ketone and having a sufficiently high boiling point not to be volatile at any of the temperatures employed. Such a mixture lowers the melting point and permits the use of the absorbent at a lower temperature in a liquid form. Examples are diphenyl, diphenyl ether, their derivatives or mixtures of any of the above type compounds.

When the invention is practiced in accordance with one of its more significant variations, i. e., in which the catalyst leaves the reaction zone in a gaseous mixture, the absorbing operation may be carried out in any manner in which the gaseous catalyst containing phase is brought into intimate contact with the benzophenone absorbent in a liquid phase. The temperature suitable for this absorption may be any from room temperature up to that at which the equilibrium between the absorption and the desorption renders the operation too inefficient to be of value, i. e., not over 300 deg. F. at atmospheric pressure. The practical range extends to about 212 deg. F. since this and temperatures just below it are readily obtained with steam at atmospheric pressure. In general the temperature should be such that the absorbent is liquid.

The temperature employed for desorption, that is, the operation in which the fluoride catalyst is separated from the ketone in which it is absorbed, may be any temperature above that used for absorption up to the boiling point of the ketone or diluents or other components of the absorbent. A practical range extends from about 300 deg. to 530 deg. F. at atmospheric pressure.

The pressure used during the absorption and desorption is not critical and may vary from a high vacuum to 1000 pounds per square inch, depending on the nature of the process to which the invention is applied. It is immaterial that some or all of the components in the absorbing zone are liquefied under the pressure. A practical range for many operations will be 75 to 250 pounds per square inch.

As illustrative of an absorption and desorption operation, benzophenone was used to absorb 0.8 mole of a mixture of equal parts of hydrogen fluoride and boron trifluoride per mole of the phenone in liquid form and atmospheric pressure. The fat solution (the absorbent and the fluorides) was found to remain in liquid form at temperatures as low at 48 deg. F. At room temperature this fat solution shows about 3 mm. boron trifluoride partial pressure, thereby indicating the strong absorbing action of the phenone on the fluoride. The desorption was accomplished by heating the fat solution to 510 deg. F. and 70% of the fluorides was recovered, most of the fluorides coming off between 400 deg. and 470 deg. F. More may have been eliminated, but not detected in the analysis. The lean solution remaining (the phenone with 30% or less fluorides) was used to absorb an additional quantity of the fluorides at room temperature and atmospheric pressure, and the resulting fat solution was desorbed by gradually heating it to reach a final temperature of 530 deg. F. In this desorption 85% of the fluorides was recovered. This shows a decided efficiency in the absorption and desorption cycle. The weight ratio (within the limits of analysis) of the HF:BF₃ in the fat solution was 1.22:1. The weight ratio in the desorbed fluorides was 1.13:1 indicating that the absorbing and desorbing properties of the phenone are of the same order with respect to the hydrogen fluoride and the boron trifluoride.

As illustrative of the invention as applied to a continuous process, an apparatus may be employed having absorbing and desorbing zones. The absorbent is introduced into the absorbing zone, and flows or is moved to the desorbing zone. The gaseous product admixed with the fluorides may be passed through the absorber, preferably countercurrent to the absorbent. The fat solution after being desorbed may be returned from the desorber to the absorber, and thus continuously recycled. Such a system may be used under the following conditions with an absorbent comprising benzophenone containing 5% diphenyl ether to lower the freezing point of the absorbent:

Temperature of absorber_____ 180–210 deg. F.
Temperature of desorber_____ 325 deg. F.
(approximately)
Pressure of system_____ ½″ Hg
Rate of absorbent_____ 800 cc./hr. (4.36 moles)
Rate of HF_____ 70 g./hr. (3.5 moles)
Rate of BF₃_____ 29 g./hr. (0.43 mole)

After three hours of operation the absorbent had the following composition:

|  | Fat (leaving absorbent zone) | Lean (leaving desorbent zone) |
|---|---|---|
| Mole percent benzophenone | 52.5 | 97.5 |
| Mole percent HF | 42.0 | 2.5 |
| Mole percent BF₃ | 5.5 | 0 |

As a further example of a continuous operation, pure benzophenone was used as the absorbent. The temperature in the absorber was 180–210 deg. F. and the temperature of the desorber was 375–380 deg. F. The rate of recirculation of the benzophenone was 860 cc./hr. and the mole ratio of the catalyst in the feed was HF, 0.79; BF₃, 0.095 for each mole of benzophenone. At the end of twenty-three hours operation a sample of the benzophenone was taken from the system, freed from fluorides, and its melting point found to be 114–116 deg. F. as compared with 116 deg. F. for the original benzophenone. This indicates that there are few, if any, changes in the benzophenone, and that it may be recycled continuously without substantial alteration or loss.

In the above illustrative examples the process is carried out at atmospheric, or substantially atmospheric, pressure. When higher pressures are used, correspondingly higher temperatures may be employed with advantage because of the higher boiling point of the absorbent and the higher dissociation temperature of the complex under pressure. For example, when operating at 150 pounds per square inch, a temperature correspondingly higher than the optimum temperature at atmospheric pressure may be used.

While the invention has been described particularly with reference to benzophenone, and the preferred temperatures given that are especially suitable for use therewith, it will be understood that other di-aryl ketones may be used as explained heretofore. When using such other absorbents, the temperatures of the operation should be selected with reference to the melting and boiling points thereof, and the absorption and desorption equilibrium point, the pressure used, and other factors, as will be apparent to one skilled in the art in the light of the explanation and disclosure herein.

The invention has been described particularly with reference to the recovery of hydrogen and boron fluorides in gaseous form, but it is to be understood that it is not limited to such an operation. Under appropriate conditions liquid phase operation may be used.

The invention is applicable to the recovery of fluorides from any compound or composition with which they may be admixed, and there are no limitations in this regard except that the chemical should not form a complex or otherwise react with the absorbent. The invention is particularly applicable to the separation of the fluorides from normally gaseous aliphatic hydrocarbons, saturated or unsaturated. It is also applicable, but with less striking results, to aromatic hydrocarbons, since the aromatics have a tendency to be soluble or form complexes with certain of the phenones. The fluorides that may be recovered in accordance with the invention may be present either as hydrogen fluoride or boron trifluoride alone, or in a mixture in any proportion. The separate fluorides or their mixtures may be present in any proportion in the hydrocarbon or other material from which they are to be separated and recovered. The fluorides recovered in accordance with the invention may be returned to the catalytic or other process using the same, or stored for any future use.

The fluorides being absorbed in accordance with the invention have been designated as hydrogen and boron trifluoride because these are of particular importance cominercially. However, it is believed that any fluoride which is volatile under the conditions of the process may be treated similarly.

The fluorides have been referred to as catalysts in describing the invention because that is their principal present use. However, the invention is not limited to their recovery in connection with a process in which they have been used as catalysts. They may be recovered from other operations such as processes of purification, or processes in which the fluorides are a reacting component or a final product.

It will be understood that the invention is capable of many applications and modifications, and it is not to be limited by any illustrative examples or other preferred forms described herein except as required by the following claims:

I claim:

1. In a method of recovering a volatile fluoride selected from the group consisting of hydrogen fluoride and boron trifluoride, the step which comprises absorbing the fluoride in a di-aryl ketone.

2. In a method of recovering a fluoride selected from the group consisting of hydrogen fluoride and boron trifluoride, the step which comprises contacting said fluoride with benzophenone, whereby the fluoride is absorbed thereby.

3. In a method of recovering a catalyst comprising a fluoride selected from the group consisting of hydrogen fluoride and boron trifluoride, the step which comprises contacting said catalyst with a di-aryl ketone.

4. In a method of recovering a catalytic substance from a material containing the same, said catalytic substance comprising a fluoride selected from the group consisting of hydrogen fluoride and boron trifluoride, the step which comprises contacting the catalytic substance containing material with benzophenone, whereby the fluoride is absorbed from the material by the benzophenone.

5. The method of recovering a volatile fluoride selected from the group consisting of hydrogen fluoride and boron trifluoride, which comprises absorbing the fluoride in a di-aryl ketone and subsequently desorbing the fluoride from the ketone.

6. The method of recovering a volatile fluoride selected from the group consisting of hydrogen fluoride and boron trifluoride, which comprises absorbing the fluoride in benzophenone in liquid form and subsequently desorbing the fluoride from the benzophenone.

7. The method of recovering a fluoride selected from the group consisting of hydrogen fluoride and boron trifluoride, which comprises contacting a material containing the fluoride with a diphenyl ketone to absorb at least a part of the fluoride, and heating said ketone containing the absorbed fluoride to liberate at least a part of the fluoride therefrom.

8. A method of recovering a volatile fluoride selected from the group consisting of hydrogen fluoride and boron trifluoride, which comprises contacting said fluoride with a di-aryl ketone in an absorbing zone, withdrawing the ketone and absorbed fluoride from the absorbing zone and introducing it into a desorbing zone, removing the fluoride from the ketone in the desorbing zone, and returning the desorbed ketone to the absorbing zone.

9. A method of recovering a fluoride selected from the group consisting of hydrogen fluoride and boron trifluoride, which comprises contacting said fluoride with benzophenone in an absorbing zone and at a temperature such that the benzophenone is liquid, removing the benzophenone and absorbed fluoride from the absorbing zone and introducing it into a desorbing zone, heating the benzophenone in the desorbing zone to a temperature above that maintained in the absorbing zone to desorb the fluoride from the benzophenone, and returning the desorbed benzophenone to the absorbing zone.

10. A method of recovering fluorides from a catalyst comprising a fluoride selected from the group consisting of hydrogen fluoride and boron trifluoride, from a gaseous aliphatic hydrocarbon containing phase with which said catalyst is admixed as a result of a catalytic process of treating hydrocarbons; which method comprises passing said hydrocarbon and catalyst containing mixture through an absorbing zone in contact with benzophenone at a temperature such that the benzophenone is liquid; separately removing from the absorbing zone, the benzophenone in which the fluoride is absorbed, and the fluoride freed hydrocarbon phase; introducing the benzophenone and the fluoride into a desorbing zone and applying heat to maintain the desorbing zone at a temperature higher than in the absorbing zone and to release the fluoride from the benzophenone; returning the desorbed benzophenone to the absorbing zone to absorb the fluoride from an additional quantity of the hydrocarbon and catalyst containing phase; and returning the released fluoride to the catalytic hydrocarbon treating process.

11. A method of recovering fluorides from a catalyst comprising a fluoride selected from the group consisting of hydrogen fluoride and boron trifluoride, from a gaseous aliphatic hydrocarbon contaning phase with which said catalyst is admixed as a result of a catalytic process of treating hydrocarbons; which method comprises passing said hydrocarbon and catalyst containing mixture through an absorbing zone in contact with benzophenone at a temperature at least such that the benzophenone is liquid, and up to 300 deg. F.; separately removing from the absorbing zone, the benzophenone in which at least a part of the fluoride is absorbed, and the fluoride freed hydrocarbon phase; introducing the benzophenone and the fluoride into a desorbing zone and applying heat to maintain the desorbing zone at a temperature higher than in the absorbing zone and not more than the boiling point of the benzophenone under the desorbing conditions and to release at least a part of the fluoride from the benzophenone; returning the desorbed benzophenone to the absorbing zone to absorb the fluoride from an additional quantity of the hydrocarbon and catalyst containing phase; and returning the released fluoride to the catalytic hydrocarbon treating process.

12. A method of recovering a fluoride selected from the group consisting of hydrogen fluoride and boron trifluoride, which comprises contacting the fluoride with an absorbent comprising benzophenone and an inert high boiling compound mutually soluble in the benzophenone to lower the melting point of the absorbent, and desorbing the fluoride from the benzophenone.

13. A method of recovering a fluoride selected from the group consisting of hydrogen fluoride and boron trifluoride, which comprises contacting the fluoride with an absorbent comprising benzophenone and an inert aromatic selected from the group consisting of diphenyl and diphenyl ether, and maintained at a preferential absorbing temperature at the pressure employed; and desorbing the fluoride from the benzophenone by heating to a temperature above that of the absorbing temperature and not higher than the boiling point of the benzophenone and the inert aromatic at the pressure employed.

14. A new composition of matter comprising a di-aryl ketone in which is absorbed a fluoride selected from the group consisting of hydrogen fluoride and boron trifluoride, said fluoride being releasable from said ketone upon the application of heat.

15. A new composition of matter comprising benzophenone in which is absorbed a fluoride selected from the group consisting of hydrogen fluoride and boron trifluoride, said fluoride being releasable from the benzophenone upon the application of heat without substantial chemical modification of the benzophenone.

EVERETT C. HUGHES.